(No Model.)

H. Z. BAKER.

ADJUSTABLE RUNNER FOR VEHICLES.

No. 362,242. Patented May 3, 1887.

WITNESSES.
Flora M. Barnefield
Harry C. Barnefield

INVENTOR.
Horace Z. Baker
By his Attorney
Thos. T. Barnefield

UNITED STATES PATENT OFFICE.

HORACE Z. BAKER, OF PAWTUCKET, RHODE ISLAND.

ADJUSTABLE RUNNER FOR VEHICLES.

SPECIFICATION forming part of Letters Patent No. 362,242, dated May 3, 1887.

Application filed January 22, 1887. Serial No. 225,060. (No model.)

*To all whom it may concern:*

Be it known that I, HORACE Z. BAKER, a citizen of the United States, residing at Pawtucket, in the county of Providence and State of Rhode Island, have invented a certain new and useful Wagon-Sleigh, of which the following is a specification.

This invention relates to detachable runners designed to be used in connection with a wheeled vehicle, whereby the latter may be readily converted into a sleigh without removing the wheels; and the novelty consists in the peculiar combinations and the novel construction, arrangement, and adaptation of parts, all as more fully hereinafter described and claimed.

The accompanying drawings are hereby made part of this specification, similar letters of reference thereon indicating corresponding parts.

Figure 1:
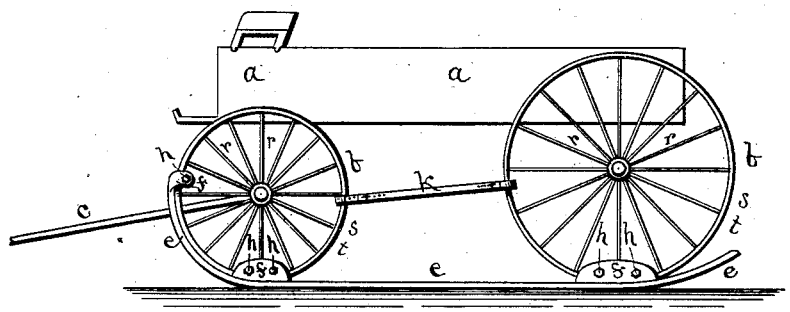
Figure 2:
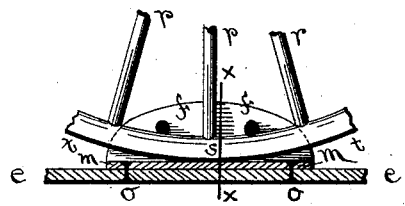
Figure 3:
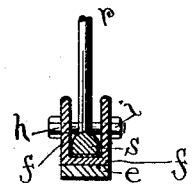
Figure 4:
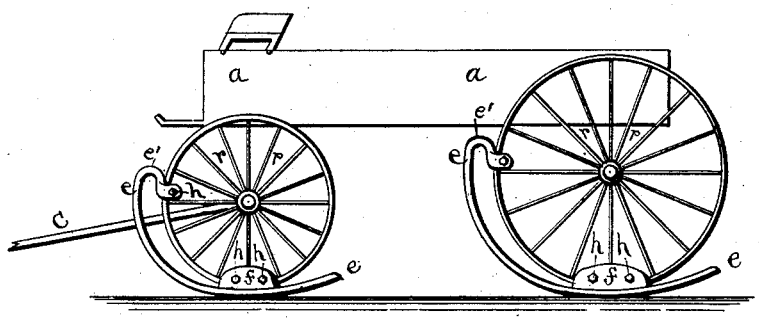

Figure 1 of said drawings is a perspective view of a wagon to which my device has been attached in such form as to make one continuous runner serve for both the forward and hind wheels on the same side of the wagon, and Fig. 4 is a like view showing my device adapted to be separately applied to each wheel. Fig. 2 is a vertical section of a wheel and of my device aforesaid through the point of their connection when used together; and Fig. 3 is a transverse vertical section on the line $x\ x$ of Fig. 2.

$a\ a$ show body of wagon, and $b\ b$ the wheels thereof, with their spokes $r\ r$, rim $s$, and tire $t$.

$c$ is the thill or shaft, and $e\ e$ the runner or runners aforesaid.

$f f$ are receptacles for the rims of the wheels, and $h\ i$ show bolts and nuts for securing the wheels to the runners and within the receptacles aforesaid.

$k$ is a strap used as an additional safeguard to prevent a revolution of the wheels when the runners are used.

The construction and use of my said device will be apparent. The runners may be made of wood shod with metal, or wholly of metal, as preferred. They may be made sufficiently long to receive both wheels on the same side of the vehicle, as shown in Fig. 1, or in shorter lengths fitted to each wheel, as in Fig. 4. The receptacles $ff$ are formed by upturned flanges or by an open sleeve cast with or firmly secured to the upper surface of the runner, the sides being sufficiently far apart to receive between them the rim and tire of the wheels, and yet are so near each other that they will firmly clasp and hold the wheel when the bolts $h\ h$ are tightened by means of the nuts $i$.

To the upper surface of the runner, immediately below the bearing-point of the wheel thereon, substantially beneath the axle, I secure by rivets $o\ o$ an elastic bearing-plate, $m$; and to this feature I attach importance, as it slightly raises the vehicle and provides a rest for the weight of the same and the load therein, thus easing the vehicle in travel over rough roads and rendering the same much less liable to be affected by the jolts occasioned thereby. These runners and fastenings may be carried in the vehicle or underneath the body thereof at any time. They can be very quickly and easily applied, as aforesaid, whenever the presence of ice or snow makes the use of runners desirable; or, having been so applied and the snow and ice failing, these runners may be as easily and quickly removed; and thus the traveler will be constantly provided with the means of meeting these changing conditions at all seasons of the year.

I am aware of the Patents Nos. 159,327, 292,383, and 294,136, and make no claim to the construction shown therein as forming part of my invention. On reference to Fig. 4 it will be noticed that my runner $e$, from the front end of the flanges $f$, is curved upwardly, not in contact with the rim of the wheel, but at a distance therefrom to a point above the horizontal line of the axle, where it is bent over, as shown at $e'$, and its end bent substantially at right angles and bifurcated to form the receptacle $f$ for the tire and rim of the wheel at this point. Through this bifurcated end passes the bolt $h$, as clearly shown in Fig. 4. This construction gives greater elasticity to the runner than by the previous constructions, rendering the occupant of the sleigh less liable to be affected by the unevenness of the snow or ice, and this is more especially the case when this feature is combined with the elastic bearing-plate beneath the wheel, as shown in Fig. 4. I therefore attach great importance to these features.

I am also aware that it has been proposed to insert a block and an elastic pad or cushion between two contiguous spokes of a wheel, the pad or cushion preventing the block from chafing the felly and compensating for shrinking or swelling of the wood, and always keeping the runner in close contact with the wheel, and such construction I do not seek to claim. The cushion thus placed has no effect in relieving the occupant of the sleigh of the jolts and jar.

What I claim as new, and desire to secure by Letters Patent, is—

1. The combination, with the wheel and the runner provided with upturned flanges to embrace the rim of said wheel, of the elastic bearing-plate $m$, secured to the upper surface of said runner between said flanges and between the rim of the wheel and the runner, substantially beneath the axle of said wheel, as and for the purpose specified.

2. The combination, with the runner $e$, formed with flanges $f$, and having an upturned outwardly-curved portion bent upon itself at $e'$ and its end bent inwardly at right angles and bifurcated, as shown, of the elastic bearing-plate $m$, secured to the upper face of said runner between the flanges and beneath the rim of the wheel, substantially beneath the axle of said wheel, as and for the purposes specified.

HORACE Z. BAKER.

Witnesses:
THOS. P. BARNEFIELD,
HARRY C. BARNEFIELD.